United States Patent [19]

Detzel et al.

[11] Patent Number: 4,951,714
[45] Date of Patent: Aug. 28, 1990

[54] MEANS FOR VERTICALLY SUPPORTING A SEGMENTED HIGH-TEMPERATURE INTERNAL CONDUIT

[75] Inventors: Roger A. Detzel, Norton; Paul S. Knoebel, Clinton; David J. Walker, Wadsworth, all of Ohio

[73] Assignee: The Babcock & Wilcox Company, New Orleans, La.

[21] Appl. No.: 432,290

[22] Filed: Nov. 6, 1989

[51] Int. Cl.⁵ .................................................. F16L 3/22
[52] U.S. Cl. ..................................... 138/106; 138/26; 138/155; 138/149; 248/901
[58] Field of Search ................. 248/49, 901; 138/106, 138/107, 26, 148, 149, 155, 120; 285/114

[56] References Cited

U.S. PATENT DOCUMENTS

| | | | |
|---|---|---|---|
| 1,966,341 | 7/1934 | Galbraith | 138/148 |
| 3,110,324 | 11/1963 | De Haan | 138/148 |
| 4,233,816 | 11/1980 | Hensley | 138/148 X |
| 4,384,696 | 5/1983 | Blake | 248/901 X |
| 4,514,103 | 4/1985 | Wise et al. | 138/106 |
| 4,570,679 | 2/1986 | Schippl | 138/148 X |
| 4,607,665 | 8/1986 | Williams | 138/148 |

*Primary Examiner*—David M. Purol
*Attorney, Agent, or Firm*—Robert J. Edwards; Michael L. Hoelter

[57] ABSTRACT

An apparatus for vertically supporting an internal conduit subject to temperature fluctuations comprising a conduit with shear lugs secured around its perimeter. These shear lugs rest upon a spool member surrounding the conduit that is configured to permit the thermal expansion/contraction of the supported conduit as needed. This spool member is, in turn, supported by an outer casing in a manner permitting the spool member to move or rotate independent of the casing. In this fashion, no rigid connector couples the internal conduit to the outer casing, instead a spool member provides the necessary support while being fully movable with respect to both the internal conduit and the outer casing.

9 Claims, 1 Drawing Sheet

U.S. Patent  Aug. 28, 1990  4,951,714

MEANS FOR VERTICALLY SUPPORTING A SEGMENTED HIGH-TEMPERATURE INTERNAL CONDUIT

FIELD OF THE INVENTION

This invention pertains to a means for vertically suspending a segmented, high-temperature conduit within an outer casing and means for accommodating the thermal expansion/contraction of same.

BACKGROUND OF THE INVENTION

In circulating fluidized bed boilers, many problems present themselves when attempting to recirculate the flow of high temperature (usually around 1,600° F.) solids. Few systems exist that can accommodate such high temperature values especially when the material being transported is a dense combination of abrasive solids and high temperature gases. Additionally, the temperature of the transported material does not remain constant but instead varies as the use of or demand on the boiler varies. When demand is low, the to-be-recycled material can accumulate in the transport conduit creating a high temperature gradient across the system; and when demand is high, the temperature of the material flowing through the transport conduit is essentially the same as the temperature of the flue gas exiting the combustor.

Furthermore, high temperature values are not the only factors affecting the transfer conduit, instead, changes or swings in these temperature values (thermal shocking) also cause damage. Temperature swings on the order of several hundred degrees over a period of several minutes have been recorded. Also, large temperature differences oftentimes occur on opposite sides of the same pipe. Additionally, should pluggage occur in an upstream section of the system (such as in a hopper), tremendous transient forces can develop in the transfer conduit wherever the blockage is released. In one instance, the level of solids in a hopper was observed to drop five or six feet in about five seconds after one such blockage was removed.

Consequently, high temperatures and forces, and rapid swings in same, cause the transport conduit to undergo significant stresses and strains as well as thermal expansion and contraction. Attempts to support such a conduit, and allow for its thermal expansion and contraction, have to date not been satisfactorily applied to circulating fluidized bed boilers because of the abrasive material being transported, the temperature and pressure requirements and the size and weight of the transport conduit itself.

It is thus an object of this invention to provide a means for vertically supporting a high temperature conduit that is subject to temperature variations ranging from ambient temperature to 1,600° F. or more as well as occasional rapid changes in internal forces. Another object of this invention is to provide a means for insulating this conduit and solidly supporting it within an outer casing. A further object of this invention is to provide a means of support that does not rigidly secure the inner conduit to the outer casing but instead allows the inner conduit to expand or contract as needed independent of the outer casing. These and other features will become obvious upon further investigation.

SUMMARY OF THE INVENTION

An apparatus for vertically suspending a conduit subject to temperature fluctuation wherein the conduit comprises first shear means secured along its outer circumference. These first shear means are maintained in alignment with a spool member upon which the conduit rests. This spool member, in turn, is maintained in alignment with second shear means secured to a support. In this fashion, the conduit is independently movable with respect to the spool member, and the spool member is independently movable with respect to the support and second shear means. Consequently, significant thermal expansion/contraction of the conduit and its supporting structure can be accommodated, and, any pressure that occurs in the conduit can be contained or withstood.

DETAILED DESCRIPTION OF THE DRAWINGS

Figure 2:
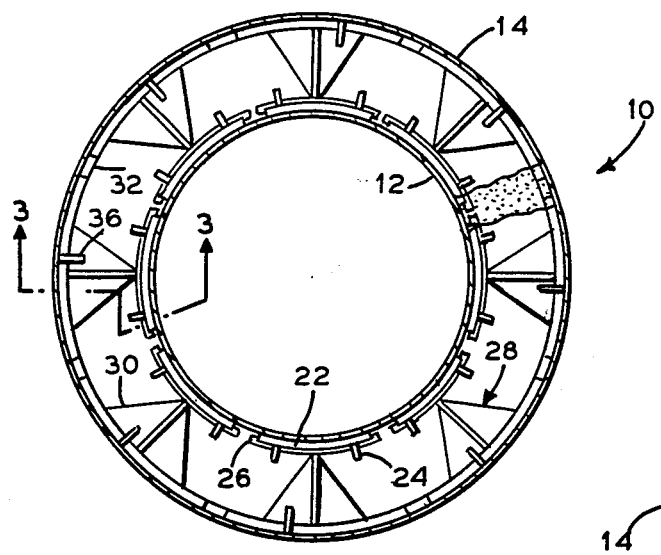
FIG. 2 is a top sectional view taken along lines 2—2 of FIG. 1, illustrating the spool member.
Figure 1:
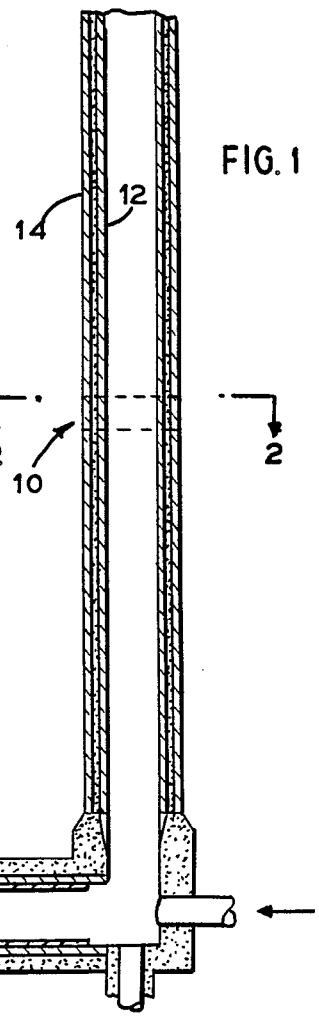
FIG. 1 is a pictorial side view of the supported internal conduit.
Figure 3:
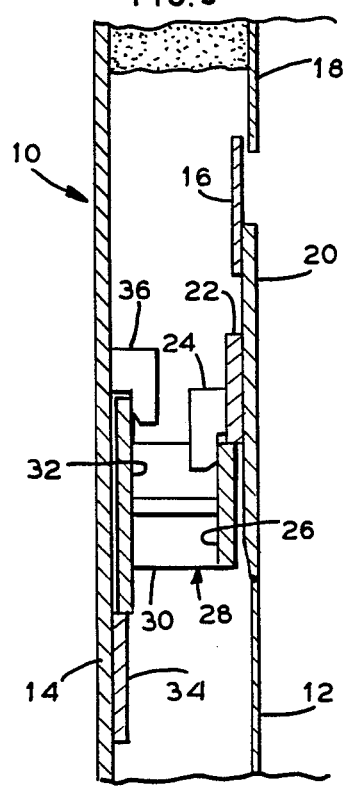
FIG. 3 is a side sectional view taken along lines 3—3 of FIG. 2.

Referring to the drawings, there is shown support 10 securing segmented, high-temperature internal conduit 12 to outer casing 14. Internal conduit 12 is designed to withstand temperatures ranging from ambient temperature to 1,600° F. or more, and for that purpose, it is generally constructed of stainless steel that has the pressure and abrasion resistant properties needed to recycle solids for circulating fluidized bed boilers.

As shown, segmented conduit 12 has collar 16 secured around the upper reinforced end of each segment. This collar 16 enables upper segment 18 to expand into lower segment 20 while remaining in axial alignment. Collar 16 is sized to closely fit around upper segment 18 so that any gas or particle loss or leakage is and remains minimal.

Also rigidly affixed to the reinforced end 20 of internal conduit 12 are a plurality of shear lugs 22. These shear lugs 22 are spaced about the outer circumference of internal conduit 12 below collar 16 and they are sized and configured to support the entire weight of the segment to which they are secured. It is preferred that these shear lugs 22 not be directly attached to each other thereby forming a continuous ring around conduit 12 but instead be spaced from each other so that there will be only limited constraint on this reinforced end as it expands or contracts.

Attached to each shear lug 22 are alignment guides 24 that radiate slightly outward and then downward from its respective shear lug 22. Two alignment guides 24 per shear lug 22 have been determined to be the optimal number since three or more such guides 24 would require accurate alignment between them while only one guide 24 would eliminate the possibility of a back-up guide should the one guide 24 fail.

The gap between the downward portion of each alignment guide 24 and the reinforced end of internal conduit 12 is sized to provide sufficient clearance to slide inner ring 26 of spool member 28 therein. As illustrated, inner ring 26 consists of a plurality of curved plates that closely conform to the curvature of the reinforced end 20 of internal conduit 12 and shear lugs 22.

The downward portion of alignment guides 24 maintain adequate bearing alignment between shear lugs 22 and inner ring 26 such that shear lugs 2 (and hence internal conduit 12) remain at-rest upon inner ring 26 without there being any rigid connector coupling the two together. Preferably, and as shown in FIG. 2, the plates of inner ring 26 are curved similar to that of shear lugs 22 with each such plate extending slightly beyond the arc of each shear lug 22. Consequently, no matter how internal conduit 12 moves or rotates, shear lugs 22 will always rest upon inner ring 26.

As illustrated, spool member 28 comprises a series of spokes 30 that extend radially to support the individual plates of inner ring 26. In practice, it was found that a series of horizontally and vertically aligned members form suitable spokes 30. Each of these spokes 30, in turn, are rigidly mounted to outer ring 32 thus completing the structure of spool member 28. Outer ring 32, as shown in FIG. 2, is of continuous construction as compared to the spaced plates of inner ring 26. Additionally, outer ring 32 is not rigidly secured to any other component (excepting spokes 30) but instead rests upon a plurality of outer shear lugs 34 much the same as inner shear lugs 22 rest upon inner ring 26. Each outer shear lug 34 is rigidly affixed to casing 14 in order to support outer ring 32 and hence spool member 28.

A plurality of outer alignment guides 36 are also secured to casing 14 and they are configured somewhat similar to inner alignment guides 24. Outer alignment guides 36 provide a gap between its downward portion and casing 14 sufficient for outer ring 32 to slide therein while bearing upon outer shear lug 34. In this fashion, spool member 28 can expand or contract, both horizontally and vertically, as well as rotate with respect to casing 14 and still remain supported by outer shear lugs 34. The same can also be said for internal conduit 12. This conduit 12 is able to expand or contract, both horizontally and vertically, as well as rotate with respect to spool member 28 and still remain supported by inner ring 26. Thus, full independent movement in any direction is provided to both internal conduit 12 and spool member 28. Also, during any such movement, collar 16 maintains the proper axial alignment of the segmented components of internal conduit 12. Consequently, two levels of thermal isolation or two methods of relieving thermal expansion/contraction are provided while still suspending conduit 12 from casing 14. Also, as can be expected, the annular region between conduit 12 and casing 14 is packed with sufficient insulation in an effort to isolate the heat of conduit 12 from casing 14.

It should here be noted that the embodiment above described is but one embodiment of this invention. Changes and/or alterations can be made in shape, configuration, or design but such changes would not alter the body of the invention as now disclosed.

What is claimed as Invention is:

1. An apparatus for vertically suspending a conduit subject to thermal expansion/contraction comprising:
   a. a vertically oriented conduit subject to temperature fluctuations due to the material being conveyed;
   b. first shear means fixedly secured to the outer perimeter of said conduit for supporting said conduit therefrom;
   c. a spool member for supporting said first shear means thereon, said first shear means resting upon and independently movable with respect to said spool member;
   d. first alignment means for maintaining alignment between said first shear means and said spool member whenever one is moved with respect to the other;
   e. second shear means fixedly secured to a support for supporting said spool member thereon, said spool member resting upon and independently movable with respect to said second shear means; and,
   f. second alignment means for maintaining alignment between said second shear means and said spool member whenever said spool member moves with respect to said second shear means.

2. An apparatus as set forth in claim 1 wherein said spool member comprises an inner ring, an outer ring, and a series of spokes connecting the two together, said inner ring being configured to engage said first shear means and support said conduit thereupon, and said outer ring being configured to engage and be supported by said second shear means.

3. An apparatus as set forth in claim 2 wherein said inner ring comprises a plurality of spaced plates each having a curvature similar to that of said first shear means, and wherein said outer ring comprises a continuous annular member.

4. An apparatus as set forth in claim 2 wherein said first shear means comprise a plurality of curved spaced plates each fixedly secured to a reinforced portion of said conduit.

5. An apparatus as set forth in claim 4 wherein said first alignment means comprise a plurality of alignment guides for maintaining the co-axial alignment of said inner ring with said first shear means.

6. An apparatus as set forth in claim 5 wherein said vertically oriented conduit comprises a plurality of segments with collar means at each segment connection for maintaining the axial alignment of a said upper segment with respect to a said lower segment.

7. An apparatus for vertically suspending a conduit subject to thermal expansion/contraction comprising:
   a. a generally vertical internal conduit comprising a plurality of segments;
   b. collar means secured to one said segment for axially aligning an adjacent said segment therewith;
   c. a plurality of first shear members secured around the outer circumference of said internal conduit;
   d. a spool member engaging said first shear members for supporting said internal conduit thereon, said internal conduit being independently movable, expandable, and contractible while being supported by said spool member;
   e. first alignment means for aligning said internal conduit with said spool member;
   f. a casing surrounding said internal conduit and said spool member;
   g. a second shear member secured to the interior circumference of said casing and supporting said spool member therefrom, said spool member being independently movable, rotatable, expandable, and contractible while being supported by said casing; and,
   h. second alignment means for maintaining the alignment of said spool member with respect to said casing.

8. An apparatus as set forth in claim 7 wherein said spool member comprises:
   a. an inner ring engaging and supporting thereupon said first shear members and hence said internal conduit, said first shear members and hence said conduit being independently movable with respect to said inner ring;

b. an outer ring engaging and being supported by said second shear member, said spool member being independently movable with respect to said second shear member; and, c. a plurality of radial spokes rigidly affixing said inner ring to said outer ring.

9. An apparatus as set forth in claim 8 wherein said first and second alignment means respectively aligning said inner and outer rings with respect to said first and second shear members.

* * * * *